(12) United States Patent
Vogel et al.

(10) Patent No.: US 6,634,607 B2
(45) Date of Patent: Oct. 21, 2003

(54) PIPE CLAMP

(75) Inventors: James E. Vogel, Prior Lake, MN (US); John L Belisle, Hampton, MN (US); Wayne M. Wagner, Apple Valley, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/953,401

(22) Filed: Sep. 14, 2001

(65) Prior Publication Data

US 2003/0052236 A1 Mar. 20, 2003

(51) Int. Cl.$^7$ ................ F16L 3/08; F16L 3/12
(52) U.S. Cl. ............. 248/74.3; 285/419; 285/373; 24/279
(58) Field of Search .............. 248/74.1, 74.3, 248/62; 24/279; 285/419, 420, 373, 367, 148.23, 148.18, 253

(56) References Cited

U.S. PATENT DOCUMENTS

| | | |
|---|---|---|
| 848,139 A | 3/1907 | Stuppar |
| 852,997 A | 5/1907 | Brandram |
| 973,466 A | 10/1910 | Beegen |
| 1,146,813 A | 7/1915 | Peterman et al. |
| 2,004,182 A | 6/1935 | Arey |
| 2,227,551 A | 1/1941 | Morris |
| 2,690,193 A | 9/1954 | Smith |
| 2,908,061 A | 10/1959 | Adams |
| 2,998,629 A | 9/1961 | Smith |
| 3,004,781 A | 10/1961 | Morris |
| 3,565,468 A | 2/1971 | Garrett |
| 3,905,623 A | 9/1975 | Cassel ............... 285/382 |
| 3,944,265 A | 3/1976 | Hiemstra et al. ......... 285/419 |
| 4,049,298 A | 9/1977 | Foti ................. 285/177 |
| 4,056,273 A | 11/1977 | Cassel ............... 285/337 |
| 4,142,743 A | 3/1979 | McGowen et al. ........ 285/23 |
| RE30,042 E | 7/1979 | Hiemstra et al. ......... 285/419 |
| 4,165,109 A | 8/1979 | Foti ................. 285/177 |
| 4,261,600 A | 4/1981 | Cassel ............... 285/177 |
| 4,312,526 A | * 1/1982 | Cassel ............... 285/419 |
| 4,364,588 A | 12/1982 | Thompson ............. 285/419 |
| 4,365,392 A | 12/1982 | Heckethorn ............ 24/256 |
| 4,408,788 A | 10/1983 | Beukema .............. 285/419 |
| 4,463,975 A | 8/1984 | McCord ............... 285/419 |
| 4,558,891 A | 12/1985 | Wagner et al. .......... 285/322 |
| 4,790,574 A | * 12/1988 | Wagner et al. .......... 285/419 |
| 4,813,720 A | * 3/1989 | Cassel ............... 285/419 |
| 5,116,083 A | 5/1992 | Gillingham et al. ... 285/148.26 |
| 6,116,659 A | * 9/2000 | Wagner ............... 285/373 |
| 6,269,524 B1 | * 8/2001 | Cassel ............... 24/279 |

FOREIGN PATENT DOCUMENTS

GB 373678 6/1932

* cited by examiner

Primary Examiner—Gwendolyn Baxter
(74) Attorney, Agent, or Firm—Merchant & Gould P.C.

(57) ABSTRACT

A clamp for sealing a lap joint is disclosed. The clamp includes a band having a main body and bolts mounting flanges located at opposite ends of the main body. A sealing bar is mounted between the bolt mounting flanges of the band. The sealing bar includes a pre-formed step for assisting in sealing the lap joint.

30 Claims, 13 Drawing Sheets

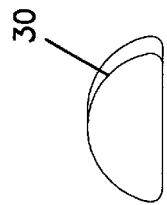
FIG.3D
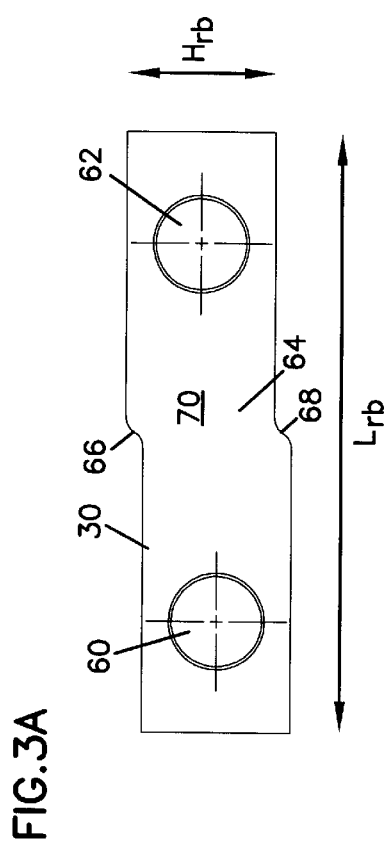
FIG.3A
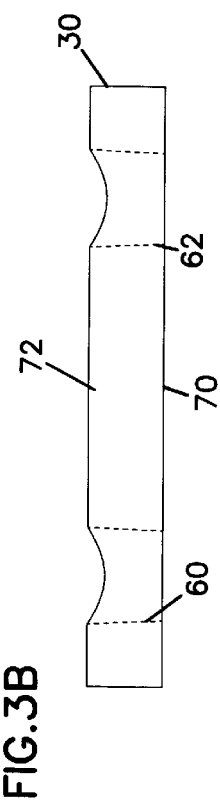
FIG.3B
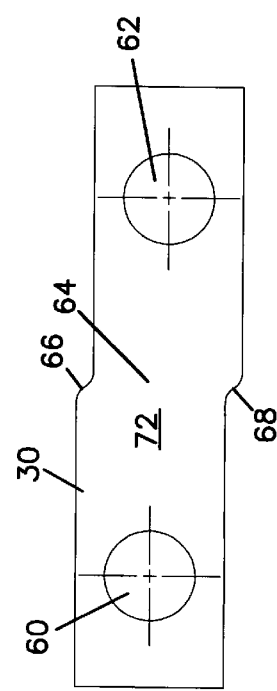
3C

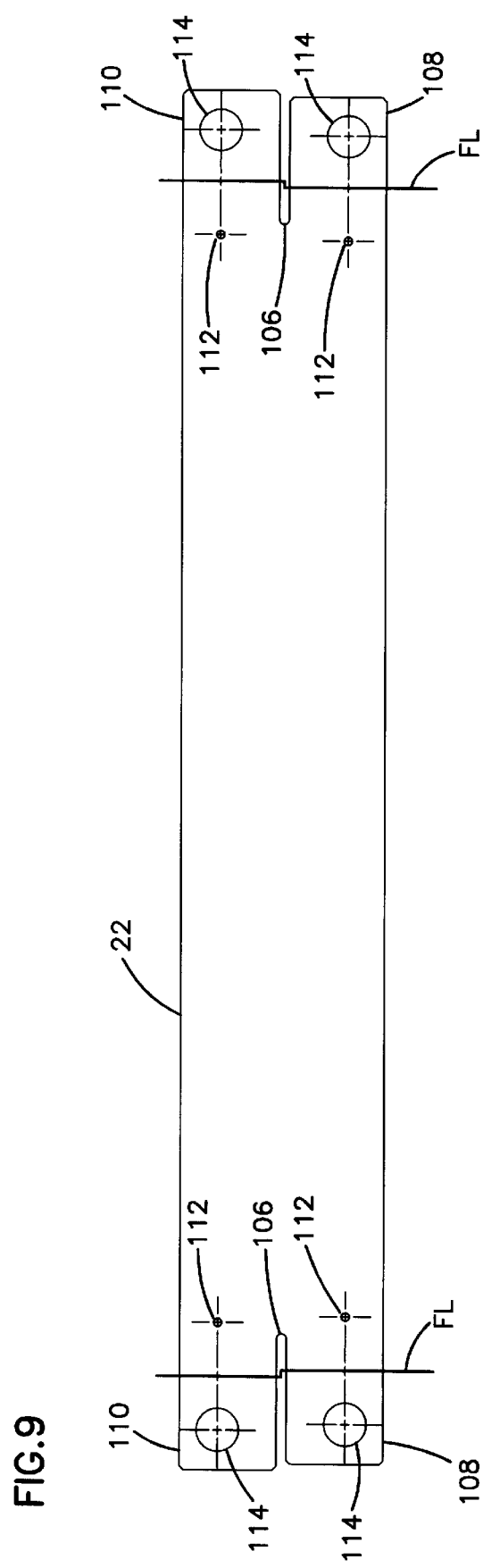

ial
PIPE CLAMP

FIELD OF THE INVENTION

The present invention relates generally to pipe clamps. More particularly, the present invention relates to pipe clamps used to seal lap joints of a vehicle exhaust system.

BACKGROUND OF THE INVENTION

There are many applications where it is desirable to connect two pipes together. One common application is vehicle exhaust systems. In vehicle exhaust systems, two pipes are often connected at a "lap joint." A "lap joint" is formed by inserting the end of one pipe into the end of another pipe such that the ends overlap one another. A clamp is then placed around the overlapped ends of the pipes. The clamp preferably functions to seal the lap joint and to mechanically connect the two pipes together such that the two pipes are prevented from being pulled apart.

Numerous patents exist relating to clamps used for vehicle exhaust systems. Some example patents relating to this field include U.S. Pat. No. 4,312,526 to Cassel, U.S. Pat. No. 4,813,720 to Cassel, U.S. Pat. No. 6,116,659 to Wagner, U.S. Pat. No. 4,790,574 to Wagner et al. and U.S. Pat. No. 5,116,083 to Gillingham et al.

SUMMARY OF THE INVENTION

The present invention relates to a pipe clamp having enhanced sealing capabilities.

A variety of advantages of the invention will be set forth in part in the description that follows, and in part will be apparent from the description, or may be learned by practicing the invention. It is to be understood that both the foregoing general description and the following detailed description are exemplary and explanatory only and are not restricted.

BRIEF DESCRIPTION OF THE DRAWINGS

FIG. 3A is a front side view of a first outer reinforcing bar of the pipe clamp of FIG. 1A;

FIG. 3B is a top view of the outer reinforcing bar of FIG. 3A;

FIG. 3C is a backside view of the outer reinforcing bar of FIG. 3A;

FIG. 3D is a left end view of the outer reinforcing bar of FIG. 3A;

FIG. 9 is a plan view of a band prior to being formed into a band clamp as shown in FIG. 1A;

Figure 1C:
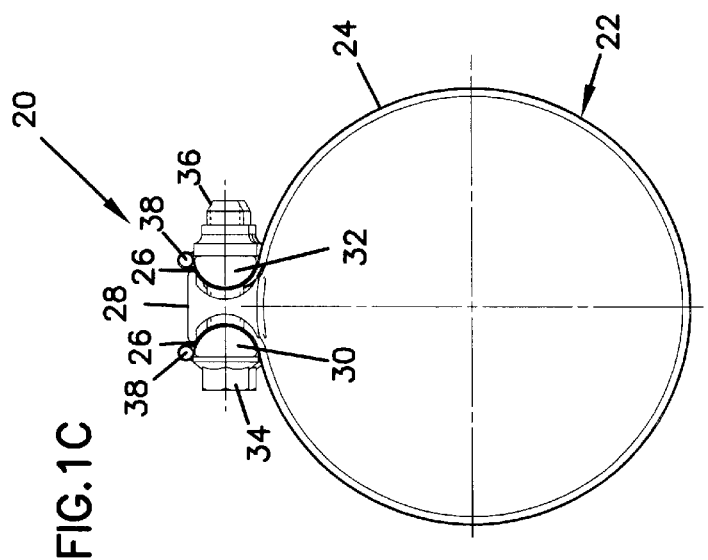
FIG. 1C is a right end view of the pipe clamp of FIG. 1A.

While the invention is amenable to various modifications and alternative forms, the specifics thereof have been shown by way of example in the drawings and will be described in detail below. It is to be understood, however, that the intention is not to limit the invention to the particular embodiments described. On the contrary, the invention is intended to cover all modifications, equivalents and alternatives falling within the scope of the invention as defined by the appended claims.

DETAILED DESCRIPTION

In the following detailed description, references are made to the accompanying drawings that depict various embodiments in which the invention may be practiced. It is to be understood that other embodiments may be utilized, and structural and functional changes may be made without departing from the scope of the present invention. Further, each of the features disclosed herein can be considered stand alone inventive features or features that have inventive aspects when considered in combination with one another.

I. General Clamp Description

Figure 1B:
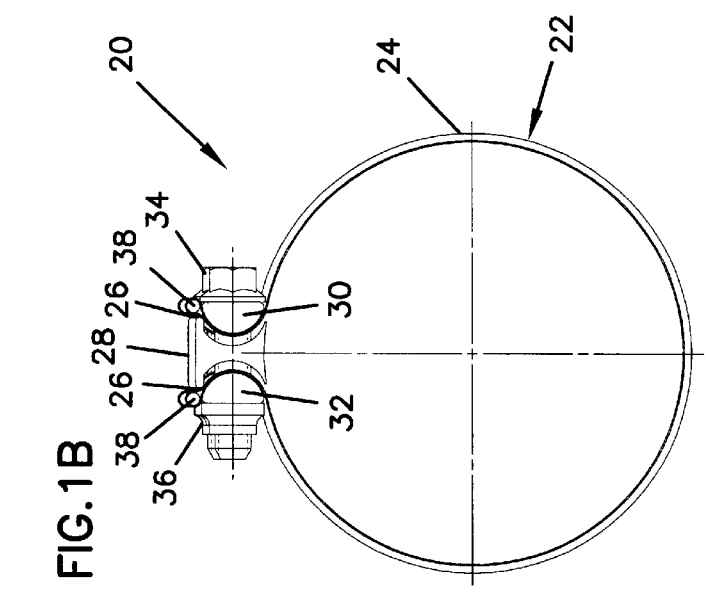
FIG. 1B is a left end view of the pipe clamp of FIG. 1A.
Figure 1A:
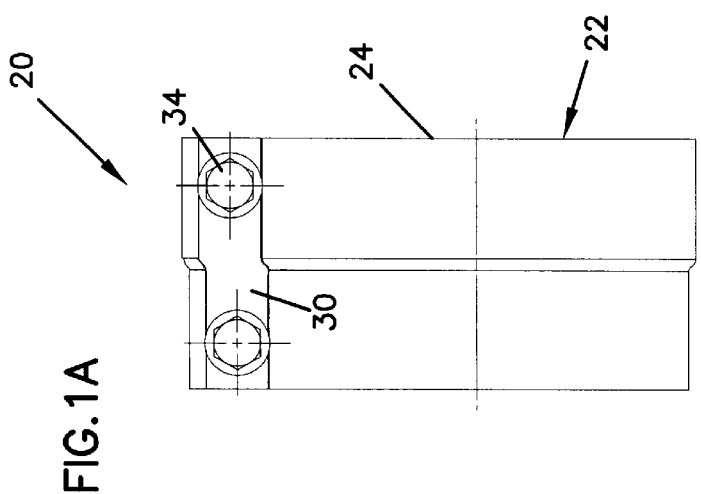
FIG. 1A is a side view of a pipe clamp that is an embodiment of the present invention.

FIGS. 1A–1C illustrate a clamp 20 that is an embodiment of the present invention. The clamp includes a band 22 having a cylindrical main body 24 and bolt mounting flanges 26 that project radially outwardly from the main body 24. Retaining bars 38 are mounted at the tops of the flanges 26. A sealing bar 28 is positioned between the bolt mounting flanges 26, and outer reinforcing bars 30 and 32 are positioned outside the bolt mounting flanges 26. Two bolts 34 extend through coaxially aligned openings defined by the bolt mounting flanges 26, the sealing bar 28 and the outer reinforcing bars 30 and 32 such that the components are fastened together. The bolts 34 are threaded within a nut bar 36 positioned outside the outer reinforcing bar 32.

II. Piece-Part Clamp Description a. Band Description

Referring to FIGS. 2A–2D, the band 22 of the clamp 20 is shown. The band 22 is preferably made of a relatively thin, ductile metal material such as stainless steel or aluminized steel. It will be appreciated that the diameter, the wall thickness and the axial length of the band 22 will vary based on intended use. One non-limiting embodiment of the present invention is made of stainless steel and has a wall thickness in the range of 0.013–0.023.

Figure 2B:
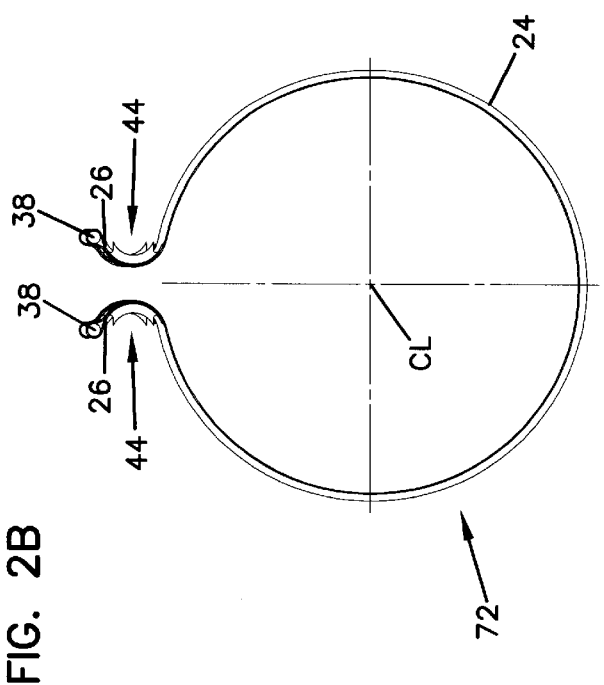
FIG. 2B is a left end view of the clamp of FIG. 2A.
Figure 2C:
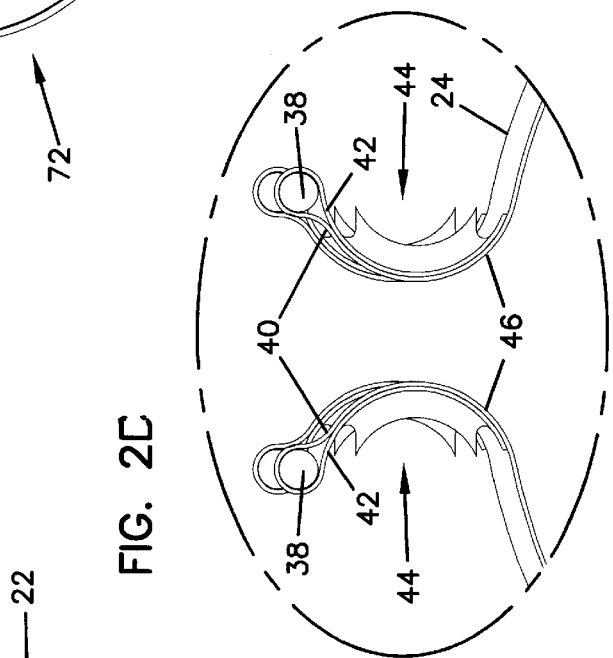
FIG. 2C is a detailed view of the flange region of the clamp of FIG. 2B.

Referring to FIG. 2B, the main body 24 of the band 22 is pre-formed into a generally cylindrical shape, and the bolt mounting flanges 26 are located at opposite ends of the main body 24. The bolt mounting flanges 26 are formed by doubled over portions of the band 22. For example, as best shown in FIG. 2C, each of the bolt mounting flanges 26 is formed by bending the band 22 around one of the retaining bars 38 to form a doubled over portion including an inner wall 40 and an outer wall 42. The bolt mounting flanges 26 are then bent (e.g., through a die forming process) to define outwardly facing concave pockets 44 sized to receive the outer reinforcing bars 30 and 32.

Figure 2A:
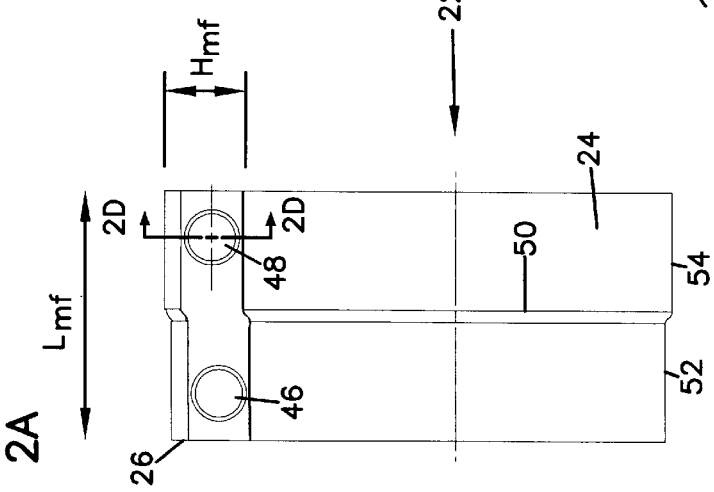
FIG. 2A is a side view of the pipe clamp of FIG. 1A with the fastening hardware removed.
Figure 2D:
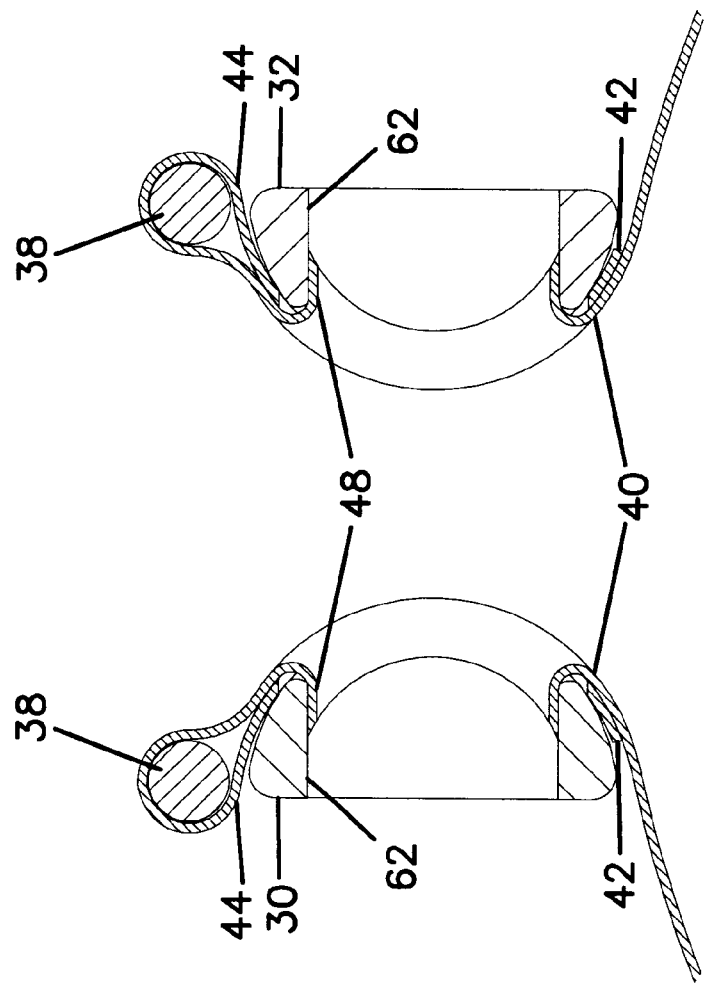
FIG. 2D is a cross-sectional view taken along section line 2D—2D of FIG. 2A.
Figure 4D:
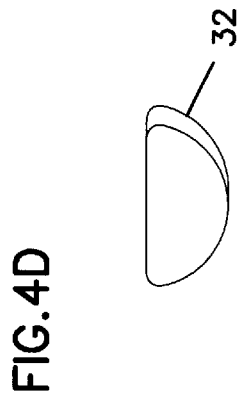
FIG. 4D is a left end view of the outer reinforcing bar of FIG. 4A.
Figure 4A:
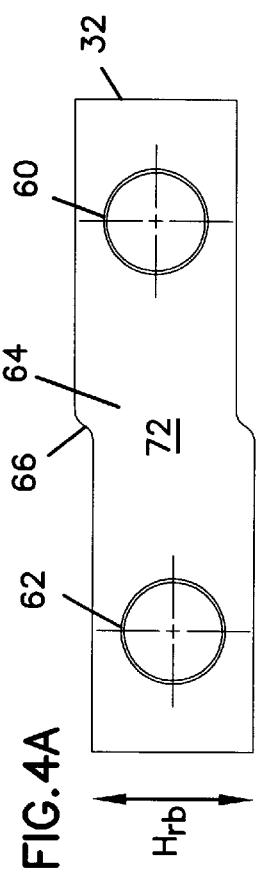
FIG. 4A is a front side view of a second outer reinforcing bar of the pipe clamp of FIG. 1A.
Figure 4B:
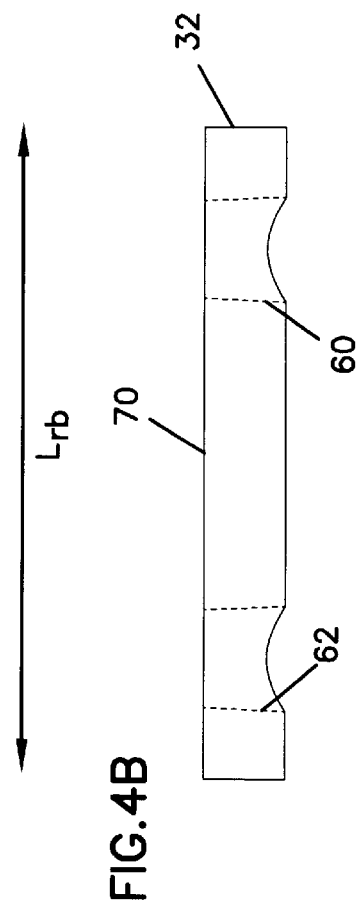
FIG. 4B is a top view of the outer reinforcing bar of FIG. 4A.
Figure 4C:
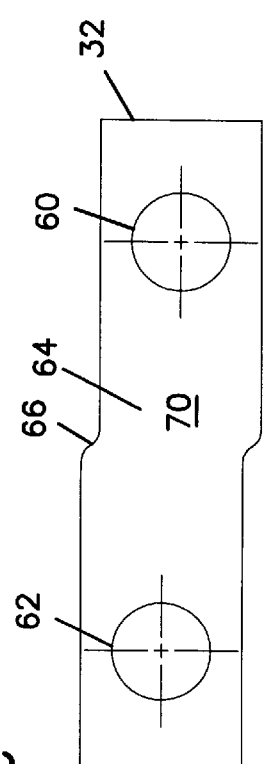
FIG. 4C is a backside view of the outer reinforcing bar of FIG. 4A.

Referring now to FIG. 2A, the bolt mounting flanges 26 each include a length $L_{mf}$ and a height $H_{mf}$. The length $L_{mf}$ corresponds to the axial length of the clamp 20 and the height $H_{mf}$ extends generally in a radial direction with respect to a center line CL of the clamp 20. Two sets of bolt openings 46 and 48 are defined through the bolt mounting flanges 26. The bolt openings 46 and 48 are preferably sized to receive the bolts 34 with a conventional clearance fit. The bolt openings 46 and 48 are spaced apart along the length $L_{mf}$ of each bolt mounting flange 26 and are staggered in a direction corresponding to the height $H_{mf}$ of each bolt mounting flange 26 (see FIG. 2A).

Referring still to FIG. 2A, a step 50 is shown extending about the circumference of the main body 24 of the band 22. The step 50 is located generally at a mid point of the axial length of the clamp 20, and has a height dimensioned to correspond generally to the wall thickness of a pipe 130 over which the clamp 20 is intended to be mounted (see FIG. 10). The amount of stagger provided between the bolt openings 46 and 48 corresponds generally to the height of the step 50. Preferably, the bolt openings 46 and 48 are centered generally along the height $H_{mf}$ of each bolt mounting flange 26. It will be appreciated that the staggering of the bolt openings 46 and 48 is preferably provided in a radial direction relative to the center line CL of the clamp 20.

The step 50 preferably extends about the entire circumference of the main body 24 of the band 22. The step 50 provides a diameter transition between a smaller diameter portion 52 and a larger diameter portion 54 of the band 22.

b. Outer Reinforcing Bar Description

FIGS. 3A–3B and 4A–4D respectively illustrate the outer reinforcing bars 30 and 32 of the clamp 20. Each of the outer reinforcing bars 30 and 32 includes a height $H_{rb}$ and a length $L_{rb}$. Each of the outer reinforcing bars 30 and 32 also defines two bolt openings 60 and 62 adapted to respectively align with the sets of bolt openings 46 and 48 defined by the bolt mounting flanges 26 of the clamp 20. The bolt openings 60 and 62 are staggered in a direction corresponding to the height $H_{rb}$. The staggering is provided by a height offset 64 positioned between the bolt openings 60 and 62. The height offset 64 includes first and second steps 66 and 68 separated by the height $H_{rb}$ of the outer reinforcing bars 30 and 32. Each of the outer reinforcing bars 30 and 32 also includes a generally flat surface 70 adapted to face outwardly from the clamp 20, and a convex surface 72 having a curvature and size selected to nest within and complement the curvature of the concave pockets 44 of the bolt mounting flanges 26. The height offset 64 is preferably positioned such that when the outer reinforcing bars 30 and 32 are mounted on the clamp 20, the height offset 64 aligns generally with the step 50 formed in the band 22.

The outer reinforcing bars 30 and 32 can be manufactured from a length of half-round steel or aluminum extrusions having a radius selected to correspond to the curvature of the concave pockets 44. To manufacture the outer reinforcing bars 30 and 32, the bolt openings 60 and 62 can be punched through the half-round steel with a conventional punch press. Before or after punching the holes 60 and 62, the offset 64 can be provided through the use of a press (i.e., a die forming process). The outer reinforcing bars 30 and 32 can be sheared to length either before or after the punching and pressing steps.

c. Retaining Bar Description

Figure 5A:
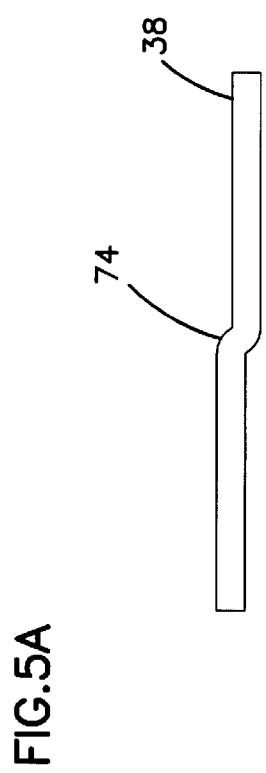
FIG. 5A is a side view of one of two retaining bars used by the pipe clamp of FIG. 1A.
Figure 5B:
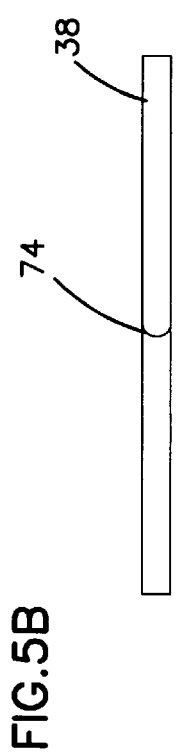
FIG. 5B is a top view of the retaining bar of FIG. 5A.
Figure 5C:
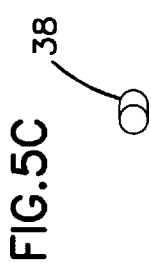
FIG. 5C is a left end view of the retaining bar of FIG. 5B.

FIGS. 5A–5C show one of the retaining bars 38 of the clamp 20. The depicted retaining bar 38 includes an intermediate step or offset 74 adapted to align with the step 50 of the band 22 when the clamp 20 is assembled. In one non-limiting embodiment, the retaining bar 38 is made from a length of steel or aluminum wire that has been cut to size and stamped or pressed to form the offset 74.

d. Sealing Bar Description

Figure 6B:
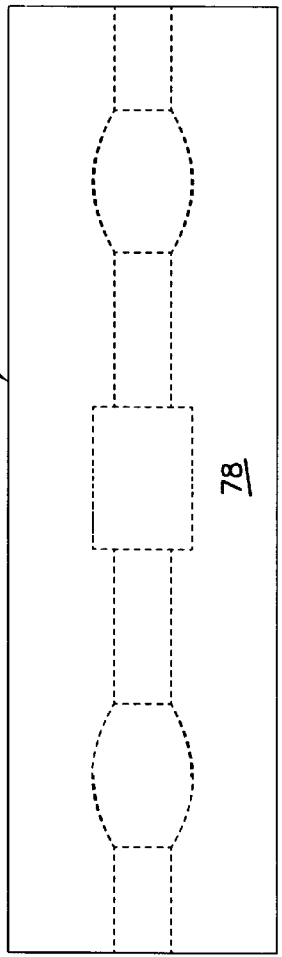
FIG. 6B is a top view of the sealing bar of FIG. 6A.
Figure 6A:
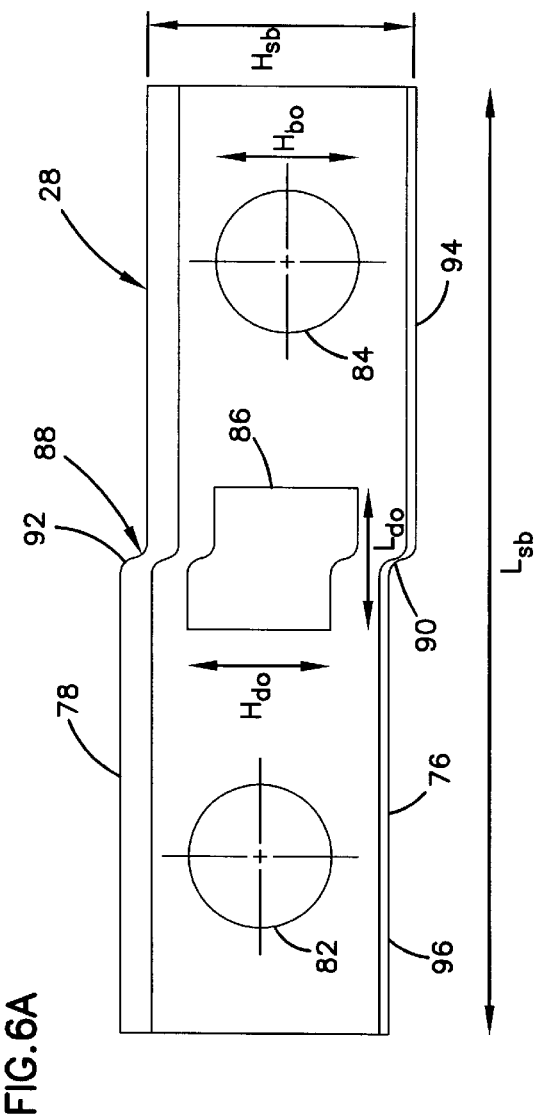
FIG. 6A is a side view of a sealing bar used by the pipe clamp of FIG. 1A.
Figure 6C:
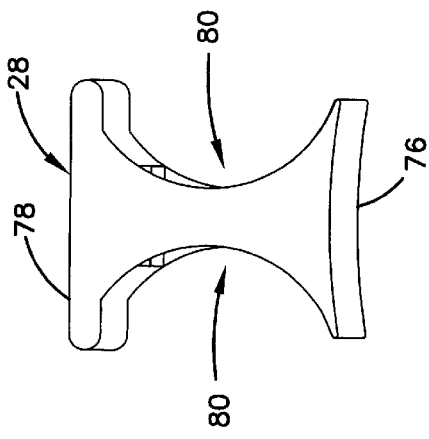
FIG. 6C is a left end view of the sealing bar of FIG. 6B.

FIGS. 6A–6C illustrate the sealing bar 28 in isolation from the clamp 20. The sealing bar 28 includes a length $L_{sb}$ and a height $H_{sb}$. The sealing bar 28 includes a sealing surface 76 and a reaction surface 78. The sealing surface 76 and the reaction surface 78 are separated by the height $H_{sb}$ by the sealing bar 28. When the clamp 20 is assembled, the sealing bar 28 is arranged such that the height $H_{sb}$ extends in a radial direction from the center line CL of the clamp 20. As so positioned, the sealing surface 76 blends generally with the curvature of the main body 24 of the band 22, and the reaction surface 78 is positioned immediately below the retaining bars 38. The sealing bar 28 defines outwardly facing concave pockets 80 (best shown in FIG. 6C) that receive the concave pockets 44 of the band 22 when the clamp 20 is assembled. The concave pockets 44 of the band 22 preferably nest within the concave pockets 80 of the sealing bar 28 (see FIG. 1A).

Referring to FIG. 6A, the sealing bar 28 defines bolt openings 82 and 84 adapted to respectively align with the bolt openings 46 and 48 of the bolt mounting flanges 26 when the clamp 20 is assembled. A deformation opening 86 is located between the bolt openings 82 and 84. The deformation opening 86 has a length $L_{do}$ and a height $H_{do}$. In a preferred embodiment, the ratio of the height $H_{do}$ to the length $L_{do}$ is in the range of 0.75 to 01.25. In a more preferred embodiment, the ratio of the height $H_{do}$ to the length $L_{do}$ is in the range of 0.9 to 1.1. In the most preferred embodiment, the ratio of the height $H_{do}$ to the length $L_{do}$ is about 1 to 1.

Referring still to FIG. 6A, the bolt openings and 82 and 84 each have a height $H_{do}$. Preferably, the $H_{do}$ of the deformation opening 86 is at least 50% of the height $H_{do}$ of the bolt openings 82 and 84. More preferably, the height $H_{do}$ of the deformation opening 86 is at least 75% as tall as the height $H_{do}$ of the bolt openings 82 and 84. Even more preferably, the height $H_{do}$ of the deformation opening 86 is at least 90% as tall as the height $H_{do}$ of the bolt openings 82 and 84. Most preferably, the height $H_{do}$ of the deformation opening 86 is about the same as the height $H_{do}$ of the bolt openings 82 and 84.

Referring still to FIG. 6A, the sealing bar 28 has an offset portion 88 located between the bolt openings 82 and 84. The offset portion 88 includes a first step 90 located at the sealing surface 76 and a second step 92 located at the reaction surface 78. The first and second steps 90 and 92 are adapted to align with the step 50 of the band 22. It will be appreciated that the first step 90 preferably is dimensioned to correspond generally to the height of the step 50 of the band 22. Thus, the sealing surface 76 includes a first portion 94 adapted to align generally with the smaller diameter portion 52 of the band 22 and a second portion 96 adapted to align with the larger diameter portion 54 of the band 22. The sealing surface 76 provides a smooth transition across the gap provided between the bolt mounting flanges 26 of the clamp 20.

The sealing bar 28 is preferably made of an extruded material such as extruded aluminum. To manufacture the bar, the extruded bar is punched to provide the bolt openings 82 and 84 and the deformation opening 86. The offset portion 86 is then provided through the use of a punch press (i.e., a forming die). Prior to forming the offset portion 88, the deformation opening 86 is preferably square or generally rectangular. The deformation opening 86 facilitates forming the offset portion 88 through the use of the punch press by providing a "weaker" location in the bar 28. After the offset portion 88 has been provided, the deformation 86 has an intermediate step that corresponds to the offset portion 88. The extrusion bar 28 can be cut to length either before or after the bar has been punched and stepped.

While it is preferred for the bar 28 to be extruded, other manufacturing techniques (e.g., casting) could also be used.

e. Description of Nut Bar and Fastener

Figure 7B:
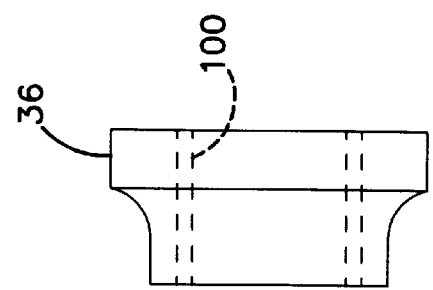
FIG. 7B is a right end view of the nut bar of FIG. 7A.
Figure 7A:
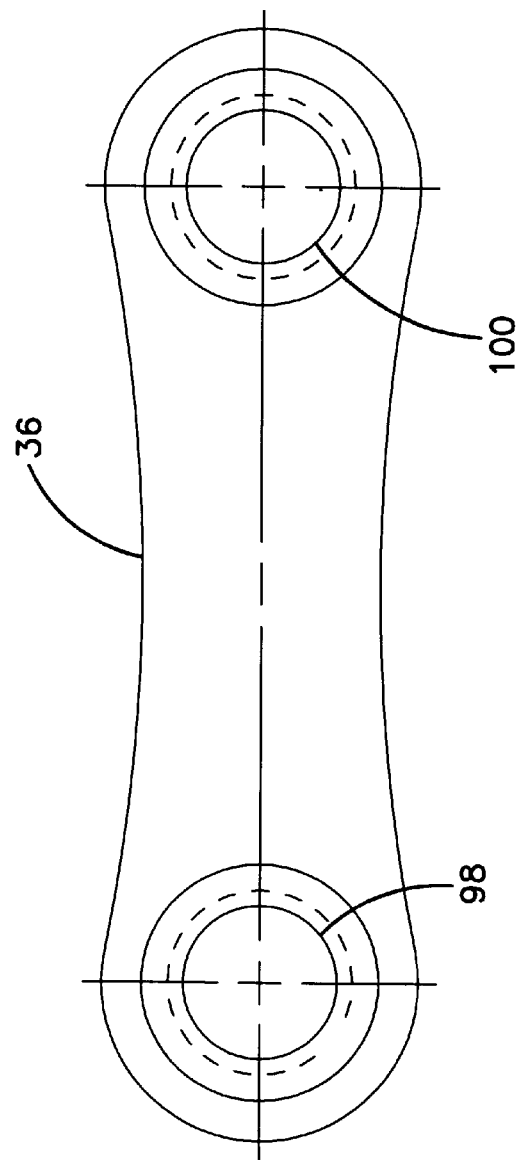
FIG. 7A is a side view of a nut bar used by the pipe clamp of FIG. 1A.

FIGS. 7A and 7B illustrate the nut bar 36 of the clamp 20. The nut bar can be made of a material such as aluminum, steel or aluminized steel. Internally threaded openings 98 and 100 are preferably extruded and then tapped through the nut bar 36. The openings 98 and 100 are sized to threadingly receive the bolts 34 of the clamp 20. The openings 98 and 100 are positioned to respectively align with the bolt openings 46 and 48 of the band 22 when the clamp 20 is assembled.

Figure 8A:
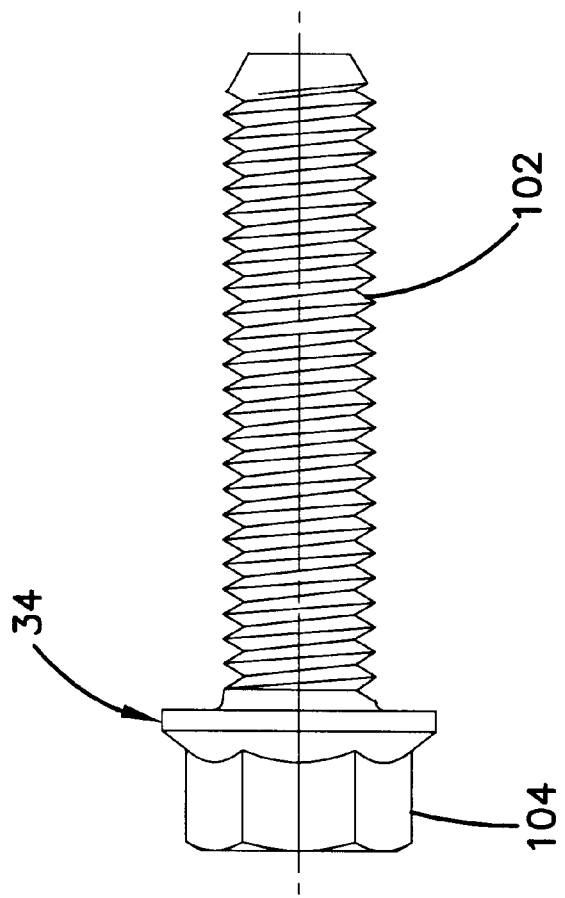
FIG. 8A illustrates one of two bolts used by the pipe clamp of FIG. 1A.
Figure 8B:
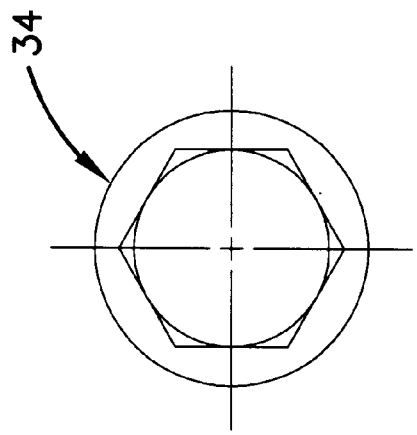
FIG. 8B is a left end view of the bolt of FIG. 8A.

FIGS. 8A and B show one of the bolts 34 of the clamp 20. The depicted bolt 34 has a threaded end 102 size to be threaded within the nut bar 36. A head 104 is located at one end of the bolt 34. When the clamp 20 is assembled, the head 104 butts against the outer reinforcing bar 32 and the nut bar 36 abuts against the outer reinforcing bar 30.

III. Manufacture of Clamp

To manufacture the clamp 20, a strip of relatively thin (e.g., approximately 0.018 inches) material is provided. Preferred materials include stainless steel or aluminized steel. To initiate the manufacturing process, slots 106 are preferably punched into the ends of the strip as shown in FIG. 9. The slots 106 define first and second ears 108 and 110 located at each end of the band 22. The first ears 108 are shorter than the second ears 110. After punching the slots 106, relatively small extrusion holes 112 and large precursor bolt holes 114 are punched through the band 22. The holes 112 and 114 corresponding to the first ear 108 are staggered relative to the holes 112 and 114 defined by their corresponding ear 110.

After punching the holes 112 and 114, the ends of the band 22 are partially bent or "doubled over" at fold lines FL located between the holes 114 and the holes 112. After the ends of the band 22 have been partially bent, the pre-stepped retaining bars 38 are positioned along the fold lines FL and the fold is completed (e.g., by using a press). After folding, the openings 114 co-axially align with the openings 112. The slots 106 assist in aligning the openings 114 with the openings 112 during the folding process. It will be appreciated that the folded over portions at the ends of the band 22 form the bolt mounting flange 26 of the clamp 20.

After the ends of the band 22 have been folded to form the bolt mounting flanges 26, the flanges 26 are bent with a forming die to form the concave pockets 44. The outer reinforcing bars 30 and 32 are then placed within the pockets 44 and the holes 112 are punched outwardly through the openings 114 with a punch having a size corresponding to a clearance opening for the bolts 34. During the punching process, material corresponding to the inner wall 40 of each mounting flange 26 is extruded through the openings 114 and into the openings 60 and 62 of the outer reinforcing bars 30 and 32 (see FIG. 2D). By extruding portions of the inner wall 40 into the bolt opening 60 and 62, the outer reinforcing bars 30 and 32 are fastened or fixed to the bolt mounting flange 26.

After the outer reinforcing bars 30 and 32 have been connected to the band 22, the band 22 is wrapped around a cylindrical mandrel. A spacer piece having a size corresponding to the sealing bar 28 is mounted between the bolt mounting flanges 26 and a clamp is used to tighten the band 22 about the mandrel. The mandrel preferably has a split collet arrangement that engages a portion of the band 22 that will later be the enlarged diameter portion 54 of the band 22. By expanding the split collet arrangement, the portion of the band 22 corresponding to the larger diameter portion 54 is expanded outwardly. As the collet expands, the enlarged diameter portion 54 deforms while the reduced diameter portion 52 maintains about the same diameter. The step 50 is formed at the edge of the split collet and provides a transition from the larger diameter portion 54 to the smaller diameter portion 52.

Once the step 50 has been formed, the band 22 is removed from a mandrel and the sealing bar 28 having the preformed offset portion 88 is inserted between these bolt mounting flanges 26. The bolts 34 are then inserted through the openings 60 and 62 of the outer reinforcing bars 30 and 32, the openings 46 and 48 of the mounting flanges 26 and the openings 82 and 84 of the sealing bar 28. Once so inserted, the bolts 34 are threaded within the nut bar 36 located adjacent to the outer reinforcing bar 32. In this manner, the bolts 34 fasten the bolt mounting flanges 26 together. As so fastened, the retaining bars 36 are positioned above the outer reinforcing bars 30 and 32 and the reaction surface 78 of the sealing bar 28.

When the clamp 20 is tightened about a lap joint, the retaining bars 38 are drawn down against the reinforcing bars 30 and 32 and the reaction surface 78 of the sealing bar 28. The retaining bars 38 are too large to fit between the relatively narrow gaps formed between the reinforcing bars 30 and 32 and the reaction surface 78 of the sealing bar 28. Thus, the retaining bars 38 prevent the bolt mounting flanges 26 from tearing at the bolt openings 46, 48 and slipping between the sealing bar 28 and the outer reinforcing bars 30 and 32.

IV. Use of Clamp

Figure 10:
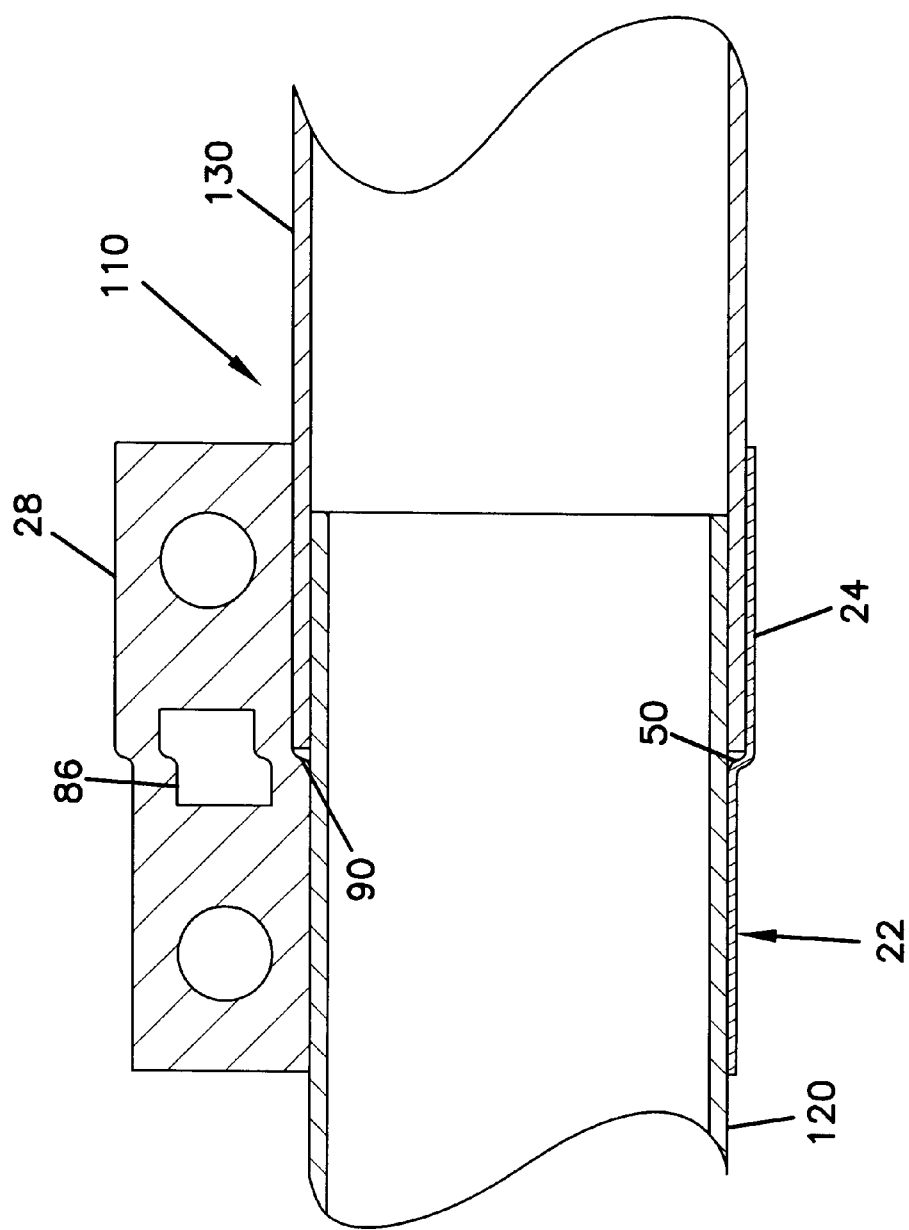
FIG. 10 shows the clamp of FIGS. 1A–1C being used to seal a lap-joint.

FIG. 10 shows the clamp 20 being used to seal a lap joint 110. As shown in FIG. 10, the first step 90 of the sealing bar 28 conforms to the step provided between inner pipe 120 and outer pipe 130. Similarly, the step 50 provided in the band 22 also conforms to the step between inner pipe 120 and outer pipe 130. The deformation opening 86 allows the sealing bar 28 to deform more greatly at the first step 90 if the step between the lap joint pipes 120 and 130 is greater than the pre-formed step provided in the sealing bar 28.

It will be appreciated that the initial step 90 provided in the sealing bar 28 is a factory manufactured step. The term "factory manufactured step" means that the step was provided prior to actually using the clamp 20 at a lap joint. A factory manufactured step is preferably made to relatively precise manufacturing tolerances.

V. Other Embodiments

In the previously discussed embodiment, the step 50 is preferably defined along substantially the entire main body 24 of the band 22. The step 50 and the step 90 of the sealing bar 28 cooperate to provide substantially a 360 degree seal about a lap joint.

It will be appreciated that in alternative embodiments the band 22 may not include a pre-formed step such as step 50. Instead, due to the inherent deformability of the material forming the band 22, the step 50 can be provided through deformation in the field. Further, in some embodiments, it may be desirable to provide a pre-formed step 50 along only a portion of the main body 24. Moreover, to promote ease of shipping, it may be desirable to ship the clamp 20 while the main body 24 is in a generally flat configuration. With this type of arrangement, an end user would bend the clamp into the generally cylindrical configuration as the clamp is being used to seal a lap joint.

Figure 11A:
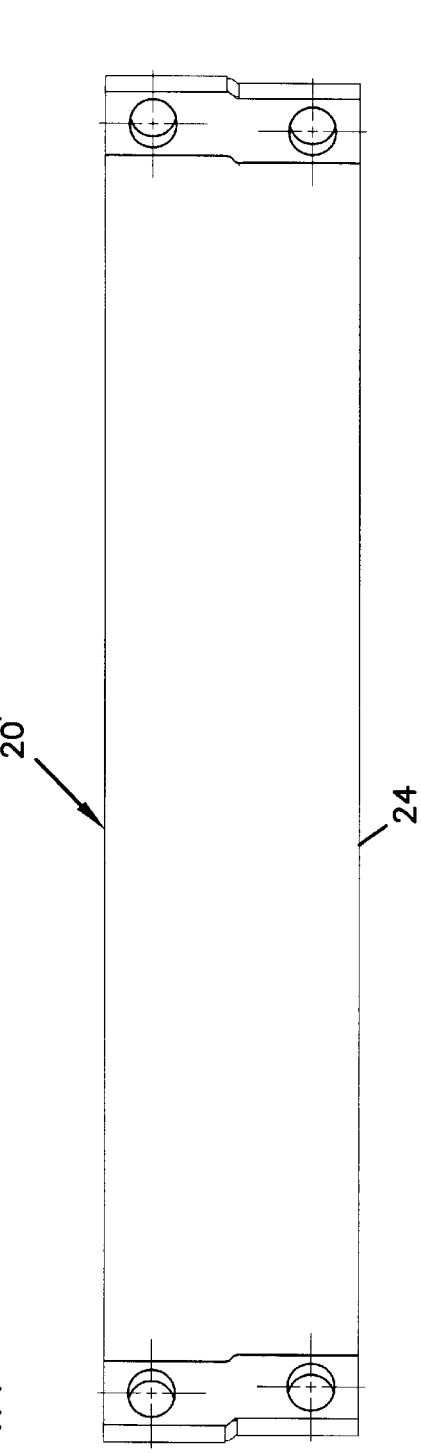
FIGS. 11A and 11B illustrate an alternative clamp that is an embodiment of the present invention.
Figure 11B:
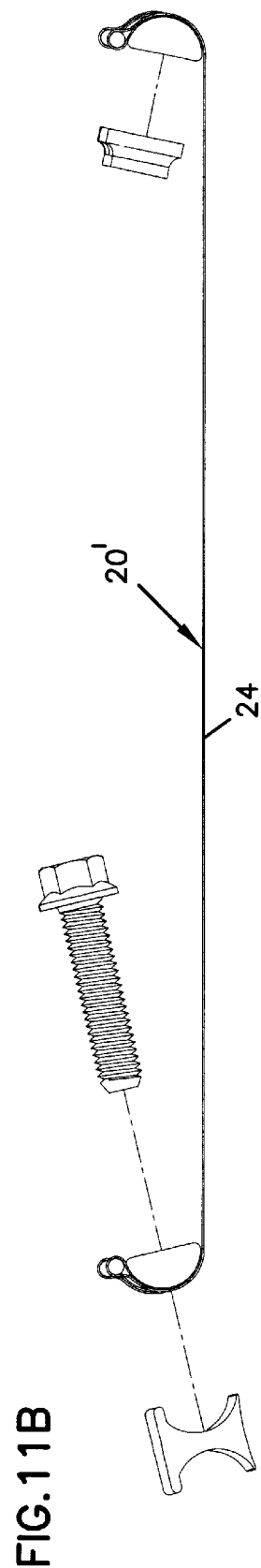

FIGS. 11A and 11B show an exemplary clamp 20' that does not have a pre-formed step 50 and is preferably shipped with the main body 24 of the band 22 in a generally flat configuration. The clamp 20' preferably includes the same fastening hardware as the clamp 20 of FIGS. 1A–1C.

Figure 12A:
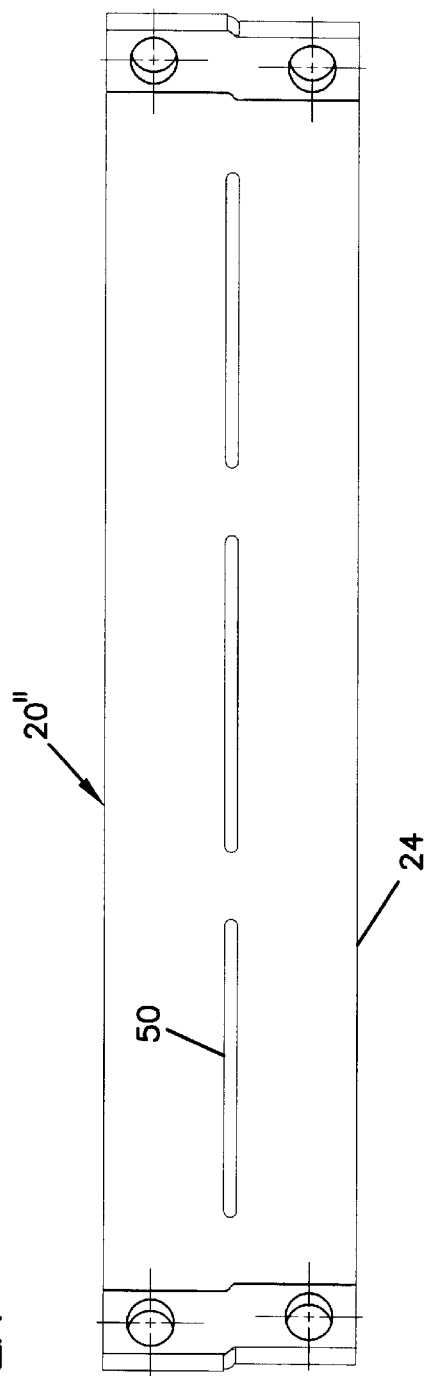
FIGS. 12A and 12B illustrate another alternative clamp that is an embodiment of the present invention.
Figure 12B:
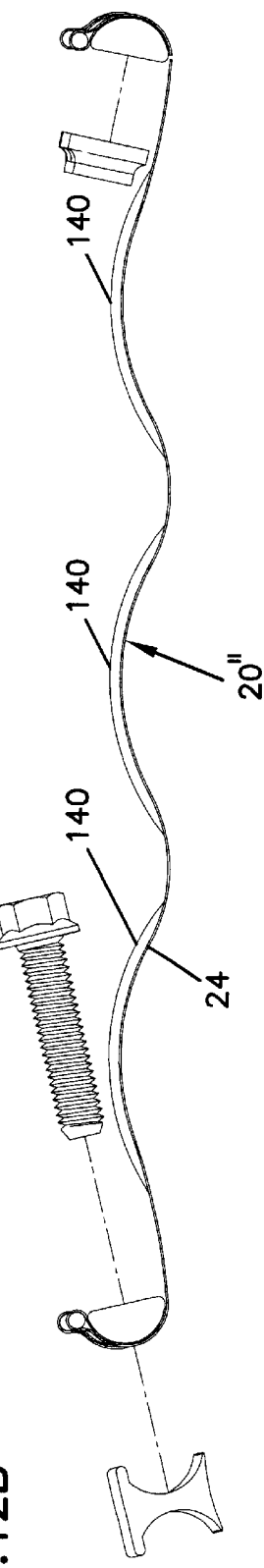

FIGS. 12A and 12B show a clamp 20" that is another embodiment of the present invention. The main body 24 of the band has an S-shaped curvature similar to the curvatures shown in U.S. Pat. No. 4,790,574, that is hereby incorporated by reference. The S-shaped curvature defines three curved humps 140. A pre-form step 50 is formed along only a portion of the length of the main body 24. The humps 140 assist an end user in wrapping the clamp 20" about a lap joint. The clamp 20" preferably includes the same fastening hardware as the clamp 20 of FIGS. 1A–1C.

With regard to the foregoing description, it is to be understood that changes may be made in detail, especially with respect to the construction materials employed and the shape, size and arrangement of the parts without departing from the scope of the present invention. It is intended that the specification and depicted aspects be considered illustrative only with a true scope end spirit of the invention being indicated by the broad meaning of the following claims.

We claim:

1. A pipe clamp comprising:
   a band including a main body and bolt mounting flanges located at opposite ends of the main body, the bolt mounting flanges each having a length and a height, the bolt mounting flanges each including first and second bolt openings spaced-apart along the length of each bolt mounting flange, the first and second bolt openings of each bolt mounting flange being staggered in a direction corresponding to the height of each bolt mounting flange, the bolt mounting flanges being defined by doubled over portions of the band, the doubled over portions being bent to define concave pockets, and portions of the bolt mounting flanges being extruded outwardly into the first and second bolt openings of the outer reinforcing bars;
   a sealing bar mountable between the bolt mounting flanges of the band, the sealing bar including a length and a height, the sealing bar including first and second bolt openings adapted to respectively align with the first and second bolt openings of the bolt mounting flanges, the first and second bolt openings of the sealing bar being spaced-apart along the length of the sealing bar and being staggered in a direction corresponding to the height of the sealing bar;
   retaining bars around which the band is bent to form the doubled over portions of the mounting flanges; and
   outer reinforcing bars mountable in the concave pockets, the outer reinforcing bars including convex portions sized to fit within the concave pockets, each of the outer reinforcing bars having a length and a height, each of the outer reinforcing bars including first and second bolt openings that are spaced-apart along the length of each outer reinforcing bar and are adapted to respectively align with the first and second bolt openings of the bolt mounting flanges, the first and second bolt openings of each outer reinforcing bar being staggered in a direction corresponding to the height of each outer reinforcing bar.

2. The pipe clamp of claim 1, wherein the outer reinforcing bars each include a step located between the first and second bolt openings of each of the outer reinforcing bars.

3. The pipe clamp of claim 1, wherein each of the retaining bars includes an intermediate offset portion.

4. The pipe clamp of claim 1, wherein the sealing bar includes a sealing side and a reaction side, the sealing side and the reaction side being separated by the height of the sealing bar, the sealing side including a step located between the first and second bolt openings of the sealing bar.

5. The pipe clamp of claim 4, wherein the reaction side of the sealing bar includes a step located between the first and second bolt openings of the sealing bar.

6. The pipe clamp of claim 1, wherein the band defines slots located between the first and second bolt openings of each bolt mounting flange.

7. The pipe clamp of claim 1, wherein the sealing bar includes a deformation opening positioned between the first and second bolt openings of the sealing bar.

8. The pipe clamp of claim 7, wherein the deformation opening has a height and a length, and wherein the ratio of the height to length is in the range of 0.75 to 1.25.

9. The pipe clamp of claim 7, wherein the first and second bolt openings of the sealing bar each have a height, and wherein the deformation opening has a height that is at least half as tall as the heights of the first and second bolt openings of the sealing bar.

10. The pipe clamp of claim 1, further comprising bolts for fastening the bolt mounting flanges together, and a nut bar defining first and second internally threaded openings for receiving the bolts.

11. A pipe clamp comprising:
   a band including a main body and bolt mounting flanges located at opposite ends of the main body, the bolt mounting flanges each having a length and a height, the bolt mounting flanges each including first and second bolt openings spaced-apart along the length of each bolt mounting flange; and
   a sealing bar mountable between the bolt mounting flanges of the band, the sealing bar including a length and a height, the sealing bar including first and second bolt openings adapted to respectively align with the first and second bolt openings of the bolt mounting flanges, the sealing bar including a sealing side and a reaction side, the sealing side being separated from the reaction side by the height of the sealing bar, the sealing bar also including an offset portion located between the first and second openings, the offset portion including a step located at the reaction side of the sealing bar and a step located at the sealing side of the sealing bar.

12. The pipe clamp of claim 11, wherein:
   the bolt mounting flanges are defined by doubled over portions of the band, the doubled over portions being bent to define concave pockets; and wherein the pipe clamp further comprises:
retaining bars around which the band is bent to form the doubled over portions of the mounting flanges; and
outer reinforcing bars mountable in the concave pockets, the outer reinforcing bars including convex portions sized to fit within the concave pockets, and each of the outer reinforcing bars including first and second bolt openings adapted to respectively align with the first and second bolt openings of the bolt mounting flanges.

13. The pipe clamp of claim 12, wherein the outer reinforcing bars include offset portions located between the first and second bolt openings of the outer reinforcing bars.

14. The pipe clamp of claim 12, wherein the retaining bars include offset portions in general alignment with the offset portion of the sealing bar.

15. The pipe clamp of claim 12, wherein the sealing bar defines concave pockets for receiving portions of the bolt mounting flanges corresponding to the concave pockets of the bolt mounting flanges.

16. The pipe clamp of claim 15, wherein when the pipe clamp is assembled, the bolt mounting flanges are positioned between the sealing bar and the outer reinforcing bars, and wherein the retaining members are positioned above the outer reinforcing bars and the reaction side of the sealing member so as to prevent the band from slipping from between the sealing bar and the outer reinforcing bars.

17. A pipe clamp comprising:
a band including a main body and bolt mounting flanges located at opposite ends of the main body, the bolt mounting flanges each having a length, the bolt mounting flanges each including first and second bolt openings spaced-apart along the length of each bolt mounting flange; and
a sealing bar mountable between the bolt mounting flanges of the band, the sealing bar including a length and a height, the sealing bar including first and second bolt openings adapted to respectively align with the first and second bolt openings of the bolt mounting flanges, the sealing bar including a sealing side and a reaction side, the sealing side being separated from the reaction side by the height of the sealing bar, the sealing bar also including a factory manufactured step located at the sealing side at a location between the first and second openings of the sealing bar.

18. The pipe clamp of claim 17, wherein:
the bolt mounting flanges are defined by doubled over portions of the band, the doubled over portions being bent to define concave pockets; and
wherein the pipe clamp further comprises:
retaining bars around which the band is bent to form the doubled over portions of the mounting flanges; and
outer reinforcing bars mountable in the concave pockets, the outer reinforcing bars including convex portions sized to fit within the concave pockets, and each of the outer reinforcing bars including first and second bolt openings adapted to respectively align with the first and second bolt openings of the bolt mounting flanges.

19. The pipe clamp of claim 18, wherein the outer reinforcing bars include offset portions located between the first and second bolt openings of the outer reinforcing bars.

20. The pipe clamp of claim 18, wherein the retaining bars include offset portions in general alignment with the offset portion of the sealing bar.

21. The pipe clamp of claim 18, wherein the sealing bar defines concave pockets for receiving portions of the bolt mounting flanges corresponding to the concave pockets of the bolt mounting flanges.

22. The pipe clamp of claim 21, wherein when the pipe clamp is assembled, the bolt mounting flanges are positioned between the sealing bar and the outer reinforcing bars, and wherein the retaining members are positioned above the outer reinforcing bars and the reaction side of the sealing member so as to prevent the band from slipping from between the sealing bar and the outer reinforcing bars.

23. A pipe clamp comprising:
a band including a main body and bolt mounting flanges located at opposite ends of the main body, the bolt mounting flanges each having a length, the bolt mounting flanges each including first and second bolt openings spaced-apart along the length of each of the bolt mounting flanges; and
a sealing bar mountable between the bolt mounting flanges of the band, the sealing bar including a length and a height, the sealing bar including first and second bolt openings adapted to respectively align with the first and second bolt openings of the bolt mounting flanges, the sealing bar including a sealing side and a reaction side, the sealing side being separated from the reaction side by the height of the sealing bar, the sealing bar also including a deformation opening at a location between the first and second openings of the sealing bar, the deformation opening having a height and a length, the ratio of the height to length of the deformation opening being in the range of 0.75 to 1.25.

24. The pipe clamp of claim 23, wherein the ratio of the height to length of the deformation opening is in the range of 0.9 to 1.10.

25. A pipe clamp comprising:
a band including a main body and bolt mounting flanges located at opposite ends of the main body, the bolt mounting flanges each having a length, the bolt mounting flanges each including first and second bolt openings spaced-apart along the length of each of the bolt mounting flanges; and
a sealing bar mountable between the bolt mounting flanges of the band, the sealing bar including a length and a height, the sealing bar including first and second bolt openings adapted to respectively align with the first and second bolt openings of the bolt mounting flanges, the first and second bolt openings of the sealing bar each having a height, the sealing bar including a sealing side and a reaction side, the sealing side being separated from the reaction side by the height of the sealing bar, the sealing bar also including a deformation opening at a location between the first and second openings of the sealing bar, the deformation opening having a height that is at least 50 percent as tall as the heights of the first and second bolt openings of the sealing bar, and the deformation opening being fully enclosed within the sealing bar.

26. The pipe clamp of claim 25, wherein the height of the deformation opening is at least 90 percent as tall as the heights of the first and second bolt openings of the sealing bar.

27. A method for making a pipe clamp comprising:
providing a band including a main body and bolt mounting flanges located at opposite ends of the main body, the bolt mounting flanges each having a length, the bolt mounting flanges each including first and second bolt openings spaced-apart along the length of each of the bolt mounting flanges;

providing a sealing bar mountable between the bolt mounting flanges of the band, the sealing bar including a length and a height, the sealing bar including first and second bolt openings adapted to respectively align with the first and second bolt openings of the bolt mounting flanges, the sealing bar including a sealing side and a reaction side, the sealing side being separated from the reaction side by the height of the sealing bar; and making a step at the sealing side of the sealing bar while the sealing bar is not fastened to the band, the step being made at a location between the first and second bolt openings of the sealing bear.

28. The method of claim 27, further comprising fastening the sealing bar to the band after the step has been made in the sealing bar, the sealing bar being fastened to the band via bolts.

29. A pipe clamp comprising:

a band including a main body and bolt mounting flanges located at opposite ends of the main body, the bolt mounting flanges each having a length and a height, the bolt mounting flanges each including first and second bolt openings spaced-apart along the length of each of the bolt mounting flanges, the bolt mounting flanges being curved such that each of the bolt mounting flanges defines an outwardly facing concave surface and an inwardly facing convex surface;

a sealing bar mounted between the bolt mounting flanges of the band, the sealing bar including a length and a height, the sealing bar including first and second bolt openings that align with the first and second bolt openings of the bolt mounting flanges, the sealing bar including a sealing side and a reaction side, the sealing side being separated from the reaction side by the height of the sealing bar, the sealing bar also including concave pockets that face in opposite directions, each of the concave pockets receiving the convex surface of a corresponding one of the bolt mounting flanges;

outer reinforcing bars including convex portions sized to fit within the outwardly facing concave surfaces of the bolt mounting flanges, each of the outer reinforcing bars having a length and a height, each of the outer reinforcing bars including first and second bolt openings that are spaced-apart along the length of each of the outer reinforcing bars and that respectively align with the first and second bolt openings of the bolt mounting flanges; and the bolt mounting flanges including portions that project outwardly into the first and second bolt openings of the outer reinforcing bars.

30. The pipe clamp of claim 29, wherein portions are extruded into the first and second bolt openings of the outer reinforcing bars.

* * * * *

UNITED STATES PATENT AND TRADEMARK OFFICE
CERTIFICATE OF CORRECTION

PATENT NO. : 6,634,607 B2 Page 1 of 1
APPLICATION NO. : 09/953401
DATED : October 21, 2003
INVENTOR(S) : Vogel et al.

It is certified that error appears in the above-identified patent and that said Letters Patent is hereby corrected as shown below:

Title Page, item (75) Inventors: "John L Belisle" should read --John I. Belisle--

Column 11, line 12, claim 27: "sealing bear." should read --sealing bar.--

Signed and Sealed this

Thirtieth Day of March, 2010

David J. Kappos
*Director of the United States Patent and Trademark Office*